(12) United States Patent
Westwater

(10) Patent No.: US 10,298,942 B1
(45) Date of Patent: May 21, 2019

(54) METHOD AND APPARATUS TO PROCESS VIDEO SEQUENCES IN TRANSFORM SPACE

(71) Applicant: ZPEG, Inc., Austin, TX (US)

(72) Inventor: Raymond Westwater, Austin, TX (US)

(73) Assignee: ZPEG, Inc., Austin, TX (US)

( * ) Notice: Subject to any disclaimer, the term of this patent is extended or adjusted under 35 U.S.C. 154(b) by 436 days.

(21) Appl. No.: 15/091,625

(22) Filed: Apr. 6, 2016

Related U.S. Application Data

(60) Provisional application No. 62/143,648, filed on Apr. 6, 2015.

(51) Int. Cl.
*H04N 19/426* (2014.01)
*H04N 19/63* (2014.01)
*H04N 19/625* (2014.01)
*H04N 19/176* (2014.01)
*H04N 19/65* (2014.01)
*H04N 19/124* (2014.01)
*H04N 19/85* (2014.01)
*H04N 19/182* (2014.01)

(52) U.S. Cl.
CPC ......... *H04N 19/426* (2014.11); *H04N 19/124* (2014.11); *H04N 19/176* (2014.11); *H04N 19/182* (2014.11); *H04N 19/625* (2014.11); *H04N 19/63* (2014.11); *H04N 19/65* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 2007/0258518 A1* | 11/2007 | Tu | H04N 19/176 375/240.03 |
| 2010/0226444 A1* | 9/2010 | Thevathasan | H04N 21/2187 375/240.29 |
| 2011/0019736 A1* | 1/2011 | Koyabu | H04N 19/00187 19/187 |
| 2012/0057629 A1* | 3/2012 | Shi | H04N 19/52 375/240.03 |
| 2012/0218440 A1* | 8/2012 | Liu | H04N 19/176 348/231.99 |
| 2013/0322528 A1* | 12/2013 | Fuchie | H04N 19/172 375/240.07 |

* cited by examiner

*Primary Examiner* — James M Anderson, II
(74) *Attorney, Agent, or Firm* — Lee & Hayes, P.C.

(57) ABSTRACT

A system configured to preform pre-compression on video sequences within a transform space to improve the compressibility of the video sequence during standard video encoding. In some cases, the pre-compression is configured to prevent the introduction of perceivable distortion into the video sequence or to substantially minimize the introduction of perceivable distortion. In some examples, a transform-Domain video processor may pre-compress or pre-process the video sequence in one, two, or three dimensional blocks or sequences using models of human visual contrast sensitivity.

20 Claims, 16 Drawing Sheets

$$900 \rightarrow CSF(u, I, X_0, X_{max}) = \frac{M_{opt}(u, I, X_0)/k}{\sqrt{\frac{2}{T} * \left(\frac{1}{X_0^2} + \frac{1}{X_{max}^2} + \frac{u^2}{N_{max}^2}\right) * \sqrt{\left(\frac{1}{\eta * p * E(L, X_0)} + \frac{\Phi_0}{1 - e^{-(u/u_0)^2}}\right)}}}$$

where $$M_{opt}(u, I, X_0) = -2 * \pi * \sigma(I, X_0)^2 * u^2$$

$$\sigma(I, X_0) = \sqrt{\sigma_0^2 + (C_{ab} * d(I, X_0))^2}$$

$$d(I, X_0) = 5 - \tanh(.4 * \ln(I * X_0^2 / 40^2))$$

$$E(I, X_0) = L * \pi * (d(I, X_0)/2)^2$$

Empirically measured constants K=3, T=100ms, $N_{max}$=15, η=03, p=1.0 x $10^6$, $\Phi_0$=3 x $10^{-8}$, $\sigma_0$=.5, $C_{ab}$=.08, $u_0$=7.

And variables

- 904 → s = $\sqrt{u^2 + v^2}$, 2-D weighted spatial frequency in cycles / second.
- 902 → I, average luminance in cd/$m^2$. While normal TV luminance is around 62, the value 2 results in good agreement with JPEG quantizer values.
- 906 → $X_0$, angle in degrees subtended by the transform block
- 908 → $X_{max}$, angle in degrees subtended by the television surface
- 910 → T is 0.1 seconds

$$H(u,v,w) = \frac{1}{\{1 + (2\pi w\sqrt{u^2 + v^2})^2\}^{n/2}}$$

1300

$$CSF(s,w,I,X_0,X_{max}) = \frac{M_{opt}(s,I,X_0)/k}{\sqrt{\frac{2}{T} * \left(\frac{1}{X_0^2} + \frac{1}{X_{max}^2} + \frac{s^2}{N_{max}^2}\right) * \sqrt{\left(\frac{1}{\eta * p * E(L,X_0)} + \frac{\phi_0}{[H_1(w,L,X_0) * (1 - H_2(w,L,X_0) * F(s))]^2}\right)}}}$$

where $$M_{opt}(s,I,X_0) = -2 * \pi * \sigma(I,X_0)^2 * s^2$$

$$\sigma(I,X_0) = \sqrt{\sigma_0^2 + (C_{ab} * d(I,X_0))^2}$$

$$d(I,X_0) = 5 - \tanh(.4 * \ln(I * X_0^2/40^2))$$

$$E(I,X_0) = L * \pi * (d(I,X_0)/2)^2$$

$$H_1(w,I,X_0) = \frac{1}{[1 + (2 * \pi * w * t_1(I,X_0))^2]^{3.5}}$$

$$t_1(I,X_0) = \frac{.001 * t_{10}}{(1 + 0.55 * \ln(1 + (1 + X_0)^{-6} * E(I,X_0)/3.5))}$$

$$H_2(w,I,X_0) = \frac{1}{[1 + (2 * \pi * w * t_2(I,X_0))^2]^2}$$

$$t_2(I,X_0) = \frac{.001 * t_{20}}{(1 + 0.55 * \ln(1 + (1 + X_0)^5 * E(I,X_0)/120))}$$

Empirically measured constants K=3, T=100ms, $N_{max}$=15, η=03, p=1.0 x 10$^6$, $\Phi_0$=3 x 10$^{-8}$, $\sigma_0$=.5, $C_{ab}$=.08, $t_{10}$=32, $t_{20}$=18, $u_0$=7, And variables

- 1304 → $s=(u^2+v^2)^{1/2}$, 2-D weighted spatial frequency in cycles / second.
- 1306 → w, temporal frequency in cycles / second.
- 1302 → I, average luminance in cd/m$^2$. Normal TV luminance is around 62
- 1308 → $X_0$, angle in degrees subtended by the DCT block
- 1310 → $X_{max}$, angle in degrees subtended by the television surface
- 1312 → T is 0.1 seconds

METHOD AND APPARATUS TO PROCESS VIDEO SEQUENCES IN TRANSFORM SPACE

PRIORITY

The present application claims priority to U.S. Provisional Application Ser. No. 62/143,648, filed on Apr. 6, 2015, entitled "Method and Apparatus to Process Video Sequences in Transform Space". This provisional application is herein incorporated by reference in its entirety, and the benefit of the filing date of this application is claimed to the fullest extent permitted.

BACKGROUND

Pre-filtering is used in video encoding to remove undesirable noise from video sources. For example, a plurality of video frames are processed by a pre-filter to produce a plurality of filtered video frames. The plurality of video frames are then compressed by a video encoder. Without a pre filter, the noise degrades the performance of a video encoder by wasting a number of bits to represent the noise itself, and by introducing encoding artifacts such as blocking and ringing noise.

Existing pre-filtering solutions are implemented in two ways, as a finite impulse response filter operating over the entire frame in pixel space, or as a finite impulse response filter operating in temporal space over a selected region of fast motion discovered by means of a motion estimation operation. A finite impulse response filter converts an input sequence in pixel space into a filtered output sequence equal in number to the input sequence, by processing through a sequence of multiply-add operations.

Construction of a finite impulse filter solution implementing a specified frequency response requires construction of a finite set of taps representing the inverse Discrete Fourier Transform of the desired frequency response, substantially decreasing the possibility of constructing an arbitrary noise removal function.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 9 illustrates an example representation of a two-dimensional description of human contrast sensitivity as a function of frequency according to some implementations.

FIG. 13 illustrates another example representation a three-dimensional description of human visibility as a function of frequency according to some implementations

DETAILED DESCRIPTION

Introduction

Figure 1:
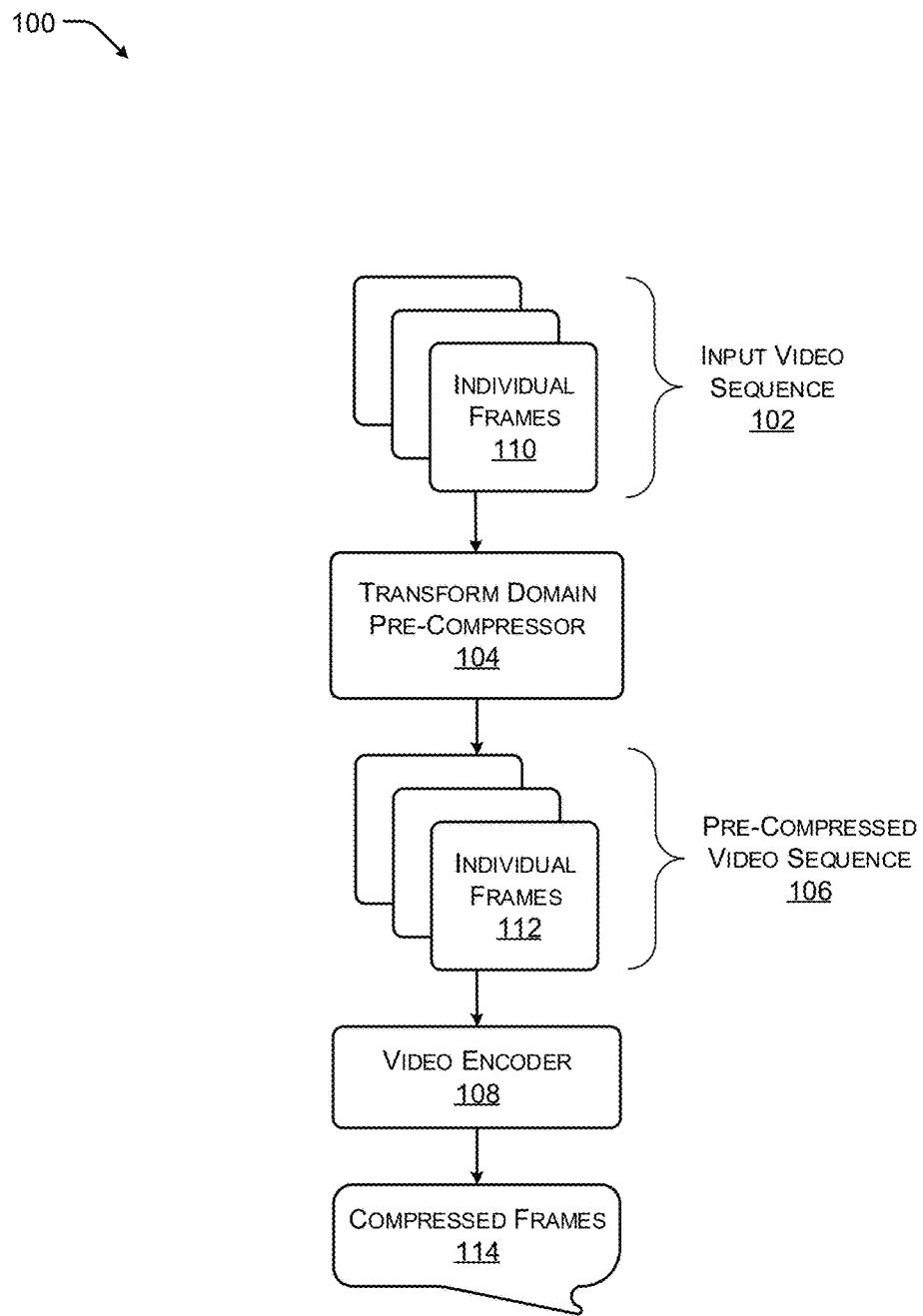
FIG. 1 illustrates an example block diagram of a system including compressing video sequences using a transform-domain video processor to pre-compress the video sequences and a video encoder to compress the pre-compressed video sequences according to some implementations.

This disclosure includes techniques and implementations for pre-compressing image data, including spatiotemporal three-dimensional video sequences, to improve compressing rates by a video encoder. For example, rather than pre-filtering the image data in the pixel domain space and/or the temporal space, which may result in a perceivable reduction in video quality as data is removed, the implementations describe herein pre-compress the image data in the transform domain space and/or the frequency domain space using functions representative of the contrast sensitivity of the human eye to configure the image data for compression in a manner that results in changes in the data that are substantially imperceptible to the human eye.

In some examples, the image data may be pre-compressed as a series of frames in one-dimensional, two-dimensional, or three-dimensional spaces. For instance, a one-dimensional processor may pre-compress the image data by processing series of adjacent pixels, such as a row of pixels within a frame, a column of pixels within a frame, or as a series of pixels having a shared coordinate within each of a plurality of frames. In another instance, a two-dimensional processor may pre-compress the image data by processing blocks of pixels within a frame. In yet another instance, a three-dimensional processor may pre-compress the image data by processing series of blocks of pixels having a shared coordinate within each of a plurality of frames.

In one specific example, a dimensional processor may apply a noise filtering function specified in transform domain to an input video sequence. In some cases, the transform domain may comprise a combination of wavelet transform, the Discrete Cosine Transform, the Karhunen-Loeve transform, or other linear transforms in one to three dimensions. The noise filtering function may include a white noise filter, a pink-noise filter, a band-pass filter or other filter function. In this example, the dimensional processor may generate an output video sequence that is substantially similar to the input video sequence when viewed by a human (e.g., the output video sequence differs from the input video sequence in ways that are imperceptible to the human eye). However, the output video sequence results in improved compression when compared with the input video sequence following compression by a video encoder.

In another specific example, a frequency response function internal to the domain processor may remove subjectively redundant visual information by calculating optimal visually-weighed quantizers corresponding to the decorrelating-transformed block decomposition of a sequence of video images. A function representative of the contrast sensitivity of the human eye to actual time-varying transform-domain frequency of each transform component may be calculated. The resolution of the transformed data (e.g., the transform representation of the original video sequence) is reduced by the calculated function representative of the contrast sensitivity of the human eye. For example, the dimensional processor may implement a three-dimensional Discrete Cosine Transform as a decorrelating transform.

Example Implementations

FIG. 1 illustrates an example block diagram of a system 100 for compressing video sequences 102 using transform domain pre-compressor 104 that includes a transform-domain dimensional engine (not shown) and a transform space shaping engine to pre-compress the video sequences 102 and a video encoder 106 to compress the pre-compressed video sequences 108 according to some implementations. In some cases, an input video sequence 102 including a plurality of individual frames 110 may be received at an image buffer (not shown). The video sequence 102 may then be pre-compressed by the transform domain pre-compressor 104 in one, two, or three dimensions. For example, the video sequence may be processed by the transform domain pre-compressor 104 in one-dimension, as series of adjacent pixels (such as a row of pixels within a frame, a column of pixels within a frame, or as a series of pixels having a shared coordinate within each of a plurality of frames), in two-dimensions, as blocks of pixels within a frame, or in three dimensions, as a series of blocks of pixels having a shared coordinate within each of a plurality of frames.

The transform domain pre-compressor 104 may process the frames 110 in the transform domain space or frequency domain space using a function representative of the contrast sensitivity of the human eye to alter the frames in a manner visually imperceptible to the human eye. Thus, after processing, the resulting pre-compressed video sequence 106 has a plurality of frames 112 with visual quality substantially equivalent to the visual quality of the frames 110 of the input video sequence 102.

The video encoder 108 receives the frames 112 of the pre-compressed video sequence 106 from the transform domain pre-compressor 104. The video encoder 108 compresses the frames 112 of the pre-compressed video sequence 106 into a compressed representation of the frames 112, referred to herein as compressed frames 114. It should be understood that, the compressed frame 114 is smaller than a compressed representation of the frame 110 of the input video sequence 102. Further, unlike traditional pixel space or temporal space pre-filtering, the video quality is substantially maintained as, for example, in pixels are not removed from the frames 110 as is the case when pre-filtering in the pixel domain. Further, the improved compression rates are maintained even when a conventional pre-filtering in the pixel space or temporal space is applied to the frames 112 before compression by the video encoder 108. Additionally, pre-filtering in the pixel space or the temporal space may be applied prior to the pre-compression of the frames 110 by the transform domain pre-compressor 104 to further improve compression rates during compression by the video encoded 108.

Figure 2:
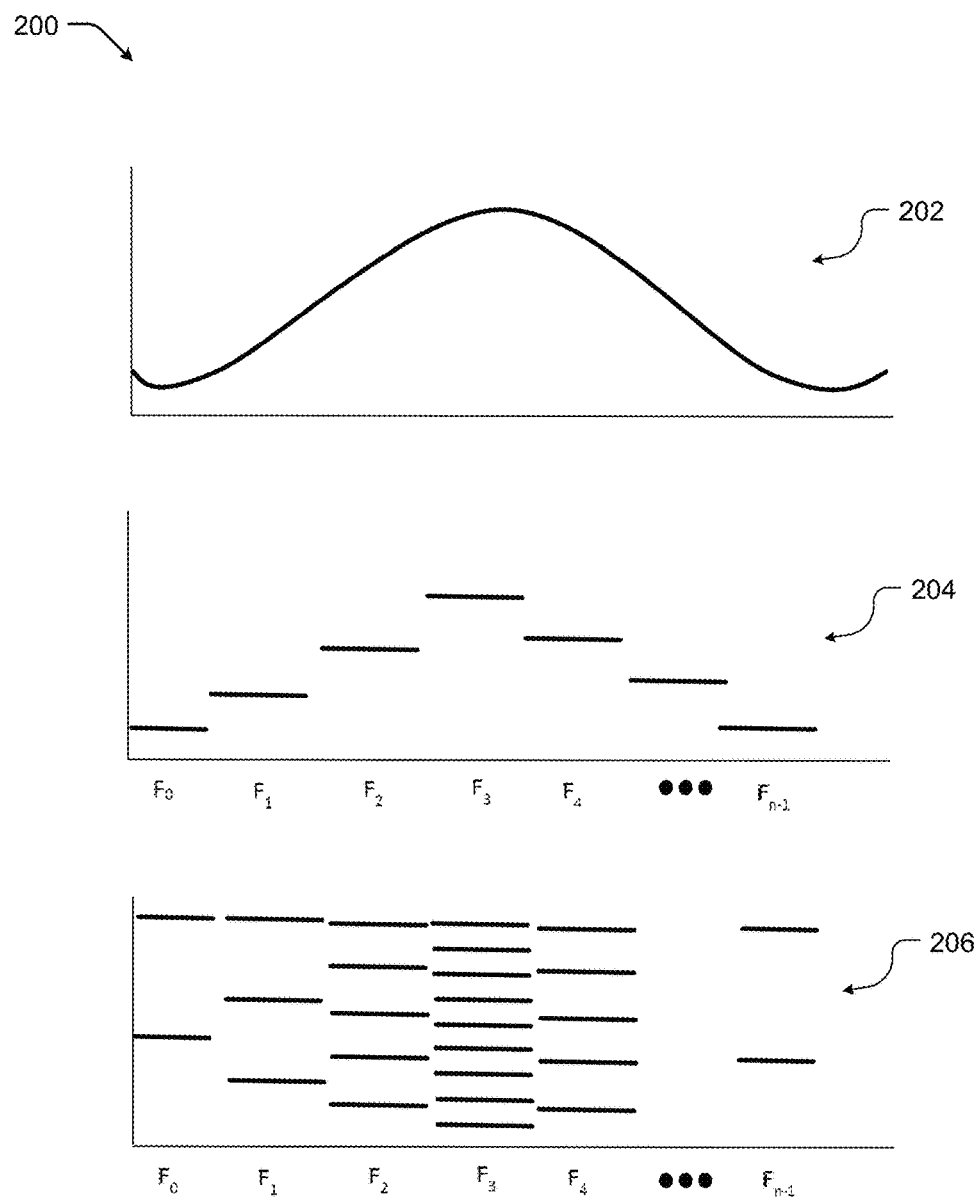
FIG. 2 illustrates an example graphical representation of transform coefficients from a family of equally-spaced transforms usable to pre-compress a video sequence according to some implementations.

FIG. 2 illustrates an example graphical representation 200 of transform coefficients from a family of equally-spaced transforms usable to pre-compress a video sequence according to some implementations. For instance, some examples of evenly-spaced domains may include the Discrete Cosine Transform (DCT) or the Karhunen-Loeve Transform (KLT).

In the illustrated example, a desired frequency response, generally indicated by graph 202, may be approximated by specifying an amplitude per evenly-spaced transform domain component frequency, generally indicated by the graph 204. Alternatively, the desired frequency response 202 may be approximated by specifying a quantizer calculated as the inverse of the amplitude per evenly-spaced transform domain component frequency, generally indicated by the graph 206. Thus, as illustrated, the amplitude of the desired frequency response 202 increases, the number of each quantizer $F_0$-$F_{n-1}$ increases and the size of each quantizer $F_0$-$F_{n-1}$ decreases.

In this example, when a dimensional processor pre-compresses the video sequence based on the desired frequency response 202, the image data of the video sequence is divided by the corresponding quantizer $F_0$-$F_{n-1}$ and rounded to the nearest integer in the domain space. For example, quantizer $F_0$ is a relatively large quantizer that allows for few steps or output data values, as the desired frequency response 202, is low at $F_0$ in the domain space. As such, more information related to the video sequence is maintained when the desired frequency response 202 is high than at points where the desired frequency response 202 is low. Thus, when the desired frequency response 202 is a function of the contrast sensitivity of the human eye, more information associated with the video sequence is maintained at points along the contrasts sensitivity functions in which the human eye is able to decipher more information.

Figure 3:
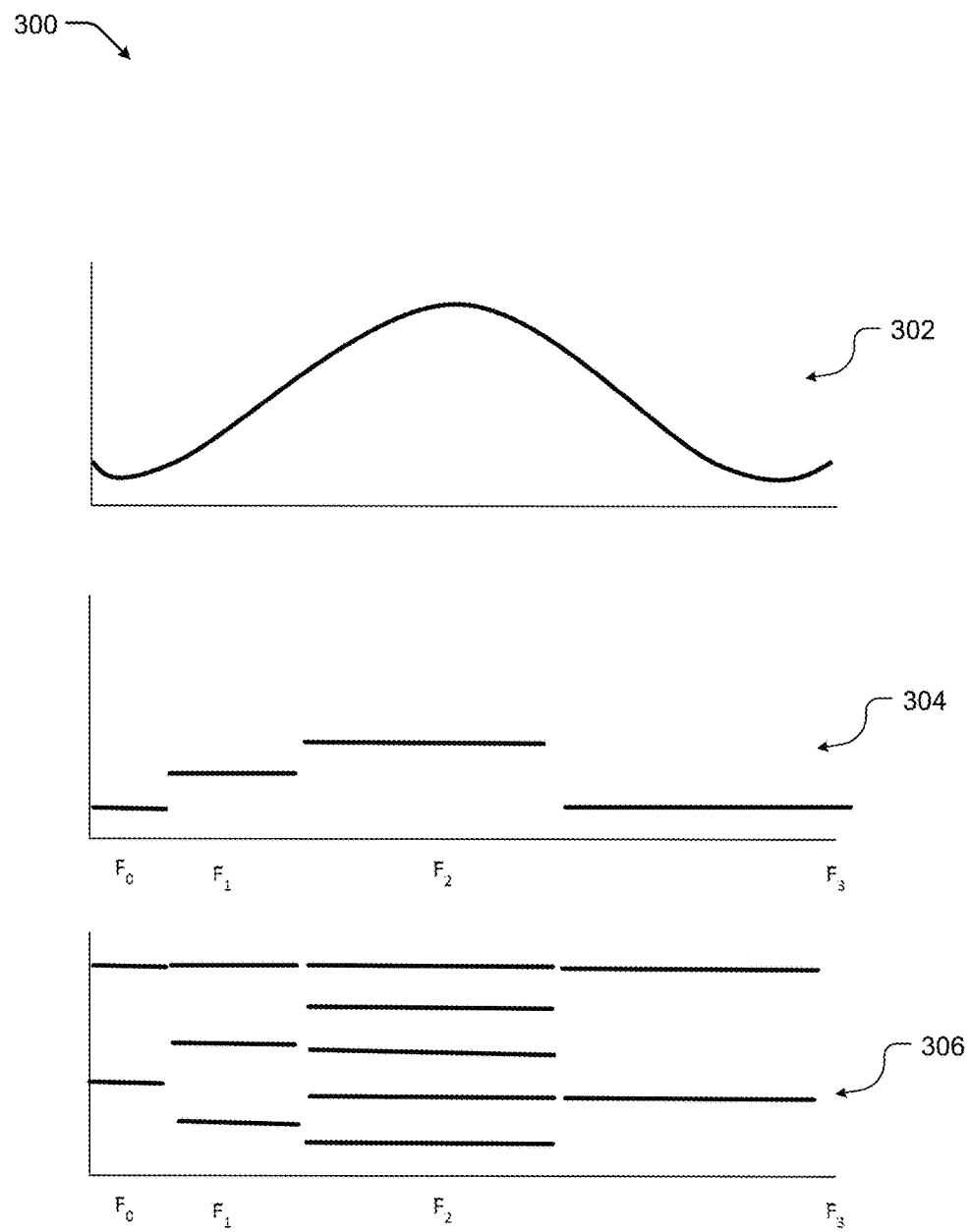
FIG. 3 illustrates an example graphical representation of transform coefficients from a family of unequally-spaced transforms usable to pre-compress a video sequence according to some implementations.

FIG. 3 illustrates an example graphical representation 300 of transform coefficients from a family of unequally-spaced transforms usable to pre-compress a video sequence according to some implementations. For example, the family of wavelet transforms is an example of an unevenly-spaced transform domain, which may be utilized by a dimensional processor to pre-compress video sequences or other image data.

In the illustrated example, an unevenly-spaced frequency transform, generally indicated by graph 302, may again be representative of a contrast sensitivity of the human eye. In the current example, the unevenly-spaced frequency transform 302 may be approximated by specifying an amplitude per unevenly-spaced transform domain component frequency, generally indicated by graph 304. Alternatively, the desired frequency response 302 may be approximated by specifying a quantizer calculated as the inverse of the amplitude per unevenly-spaced transform domain component frequency, generally indicated as 306. Thus, as described above with respect to FIG. 2, the when the desired frequency response 302 is high more information associated with the video sequence is maintained, thus, maintaining more information at points along the contrasts sensitivity functions at which the human eye is able to decipher more information.

Figure 4:
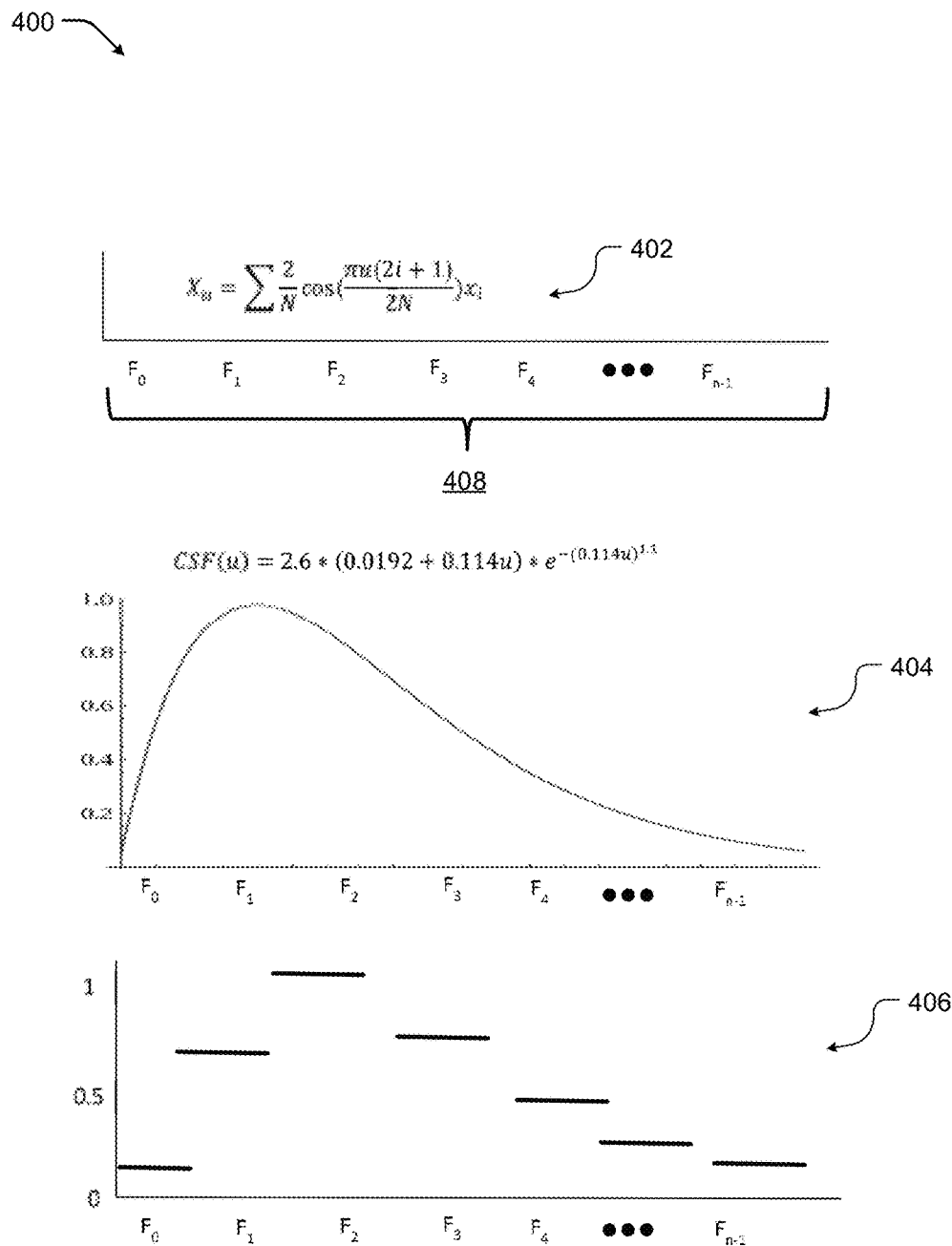
FIG. 4 illustrates an example graphical representation of multiplicative constants in a one-dimensional transform domain associated with a one-dimensional description of human visibility as a function of frequency according to some implementations.

FIG. 4 illustrates an example graphical representation of multiplicative constants 400 in a one-dimensional transform domain associated with a one-dimensional description of human visibility as a function of frequency according to some implementations. In the illustrated example, a reversible linear discrete transform, the Discrete Cosine Transform 402 is selected:

$$X_u = \sum \frac{2}{N} \cos\left(\frac{\pi u(2i+1)}{2N}\right) x_i$$

where N is the block size of the transform, i is a pixel index counting from 0 to N−1, $x_i$ is the $i^{th}$ pixel in the block, u is the mapped discrete frequency index, from 0 to N−1, and $x_u$ is the $u^{th}$ frequency amplitude.

The reversible linear discrete transform 402 maps to a set of discrete frequencies, generally indicated by 404. The frequencies 404 may be either evenly-spaced or unevenly spaced, as described above with respect to FIGS. 2 and 3. A normalized human visual system transfer function 406 is defined in frequency space such that substantially perfect reproduction of a video sequence following pre-compression is defined as unity:

$$CSF(u) = 2.6*(0.0192 + 0.114u)*e^{-(0.114u)^{1.1}}$$

where u is the frequency of the visual stimulus in cycles per degree and CSF(u) is the relative sensitivity of the human eye to the frequency u. In this example, the normalized human visual system transfer function 406 may be sampled at the discrete frequencies 404 of the reversible linear discrete transform 402 to generate the multiplicative constants 400. It should be understood, that one multiplicative constant 400 may be generated per said discrete frequency 404.

Figure 5:
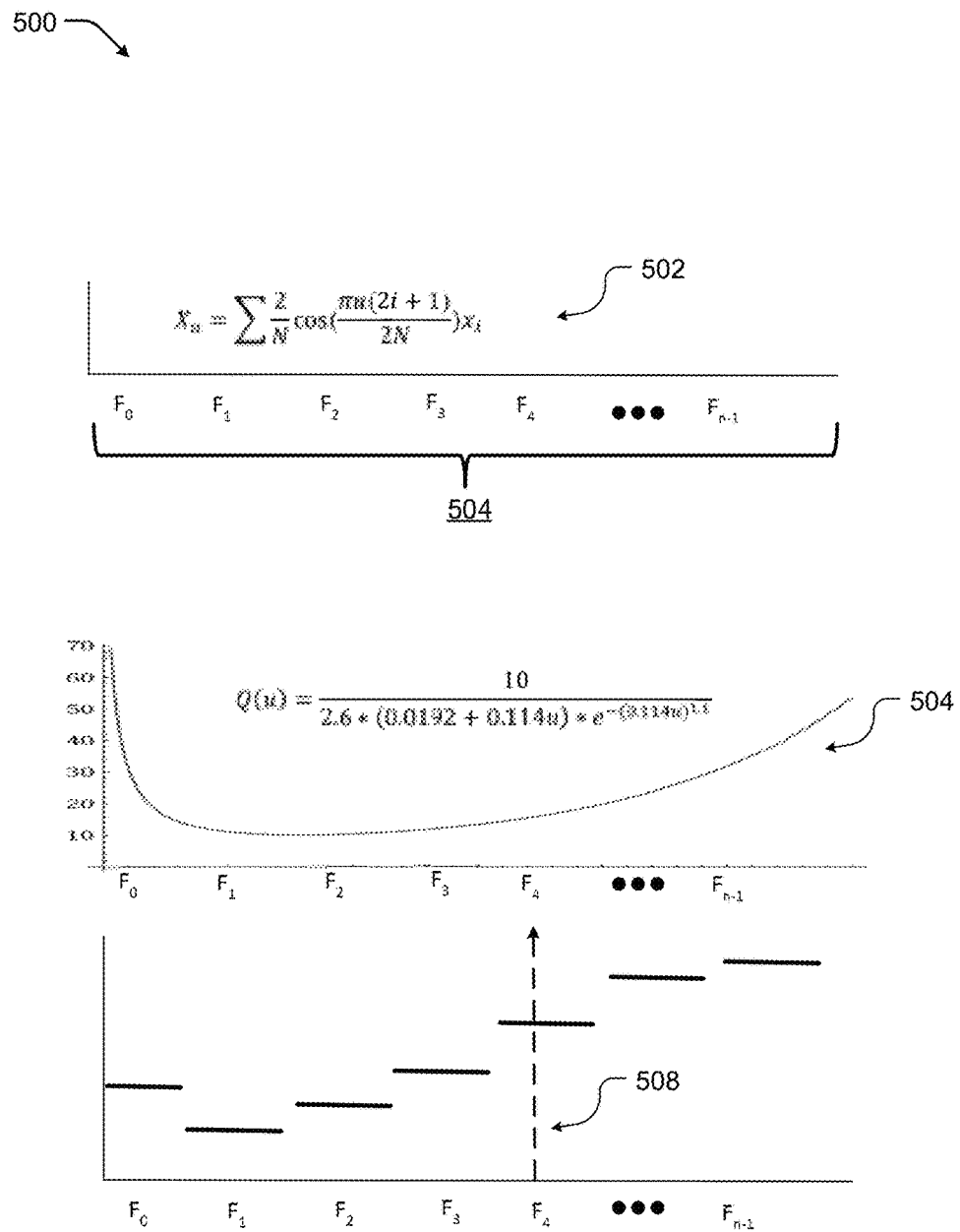
FIG. 5 illustrates an example graphical representation of quantizing values in a one-dimensional transform domain associated with a one-dimensional description of human contrast sensitivity as a function of frequency according to some implementations.

FIG. 5 illustrates an example graphical representation of quantizing values 500 in a one-dimensional transform domain associated with a one-dimensional description of human contrast sensitivity as a function of frequency according to some implementations. In the current example, a dimensional pre-compressor may assigning fixed quantizer values 500 to each individual frequency amplitude $F_0$-$F_{n-1}$.

In the illustrated example, a reversible linear discrete transform 402 is selected based at least in part to result in a mapping to a set of discrete frequencies 504. The set of discrete frequencies 504 may either be evenly-spaced or unevenly-spaced, as discussed above with respect to FIGS. 2 and 3. In this example, the scaled inverse of the normalized human visual system contrast sensitivity function 506 may be defined in transform space or frequency space as:

$$Q(u, N) = \frac{N\sqrt{N}}{2.6*(0.0192 + 0.114u)*e^{-(0.114u)^{1.1}}}$$

where N is the transform block size, u is the frequency of the visual stimulus in cycles per degree, and Q(u) is the quantizer value associated with the frequency u. In the illustrated example, the scaled inverse normalized human visual system contrast sensitivity function 506 may be sampled at the discrete frequencies $F_0$-$F_{n-1}$ 504 of the reversible linear discrete transform 502 per discrete frequency $F_0$-$F_{n-1}$. In the illustrated example, the sampling at the discrete frequencies $F_0$-$F_{n-1}$ 504 generates the quantizer value for each sampled frequency. For instance, in the current example, the scaled inverse normalized human visual system contrast sensitivity function 506 may be sampled at the discrete frequencies $F_4$, generally indicated by the line 508, to generate the quantizer value at $F_4$.

Figure 6:
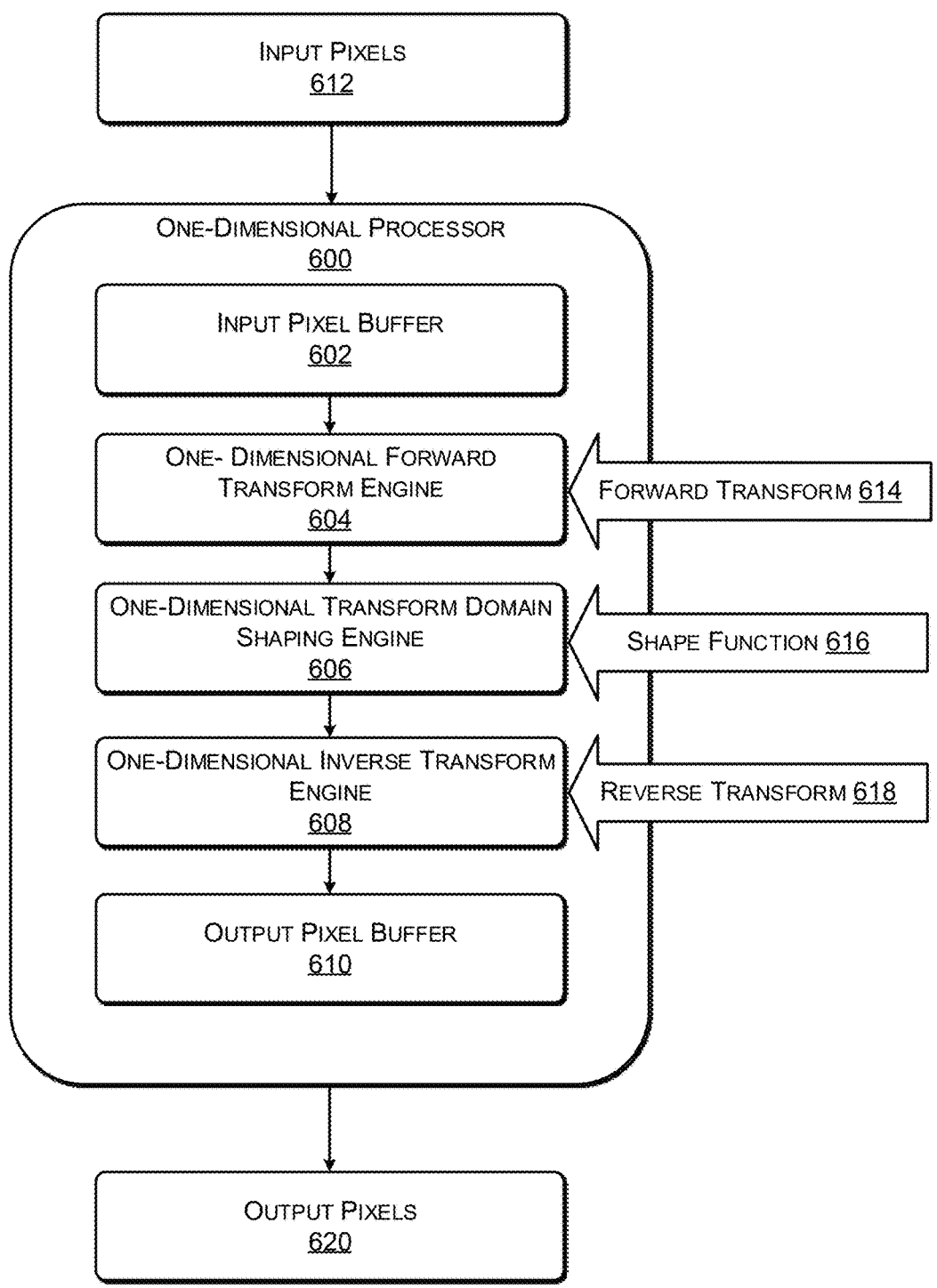
FIG. 6 illustrates an example a one-dimensional pre-compressor for pre-compressing a video sequence according to some implementations.

FIG. 6 illustrates an example a one-dimensional processor 600 for pre-compressing a video sequence according to some implementations. The one-dimensional processor 600 may include a linear pixel input buffer 602, a forward transform engine 604, a frequency domain frequency response shaping engine 606, an inverse transform engine 608, and a linear pixel output buffer 610.

During operation, the one-dimensional processor 600 receives input pixels 612 and store the input pixels in the input pixel buffer 602 prior to pre-compression. The input pixels 612 may be associated with a frame or multiple frames of a video sequence or a still image or photograph. The input pixels 612 may be a series of adjacent pixels, such as a row or column of an image, photograph, or frame of a video sequence. In some cases, the input pixels 612 may include a series of adjacent pixels over multiple frames of the video sequence, such as pixels having the same coordinate in each frame sequential of the video sequence.

Once the input pixels 612 are buffered and arranged in a desired grouping, the forward transform engine 604 may receive a reversible linear forward transform 614 selected as the transform for the pre-compression operations. In some cases, the reversible linear forward transform 614 may be a stored internal transform that is fixed relative to the pixel input 612, while in other cases, the reversible linear forward transform 614 may be selected per buffering or per video sequence. For instance, the forward transform 614 may be an evenly-spaced transform (e.g., the Discrete Cosine Transform or the Karhunen-Loeve Transform), or an unevenly-spaced transform (e.g., a wavelet transform).

In some examples, the forward transform engine 604 may be configured to perform the reversible linear forward transform 614 on the input pixels 612 stored in the linear pixel input buffer 602. The operation of the reversible linear forward transform 614 on the input pixels 612 generates a frequency domain representation of the input pixels 612 store in the linear pixel input buffer 602.

The frequency domain frequency response shaping engine 606 receives the frequency domain representation of the input pixels 612. For example, the frequency domain frequency response shaping engine 606 may be configured to apply a frequency response shape function 616 to the frequency domain representation of the input pixels 612 while stored in the linear pixel input buffer 602. The frequency response shape function 616 may cause the frequency domain frequency response shaping engine 606 to apply a multiplicative constant to individual frequency amplitudes of the frequency domain representation of the input pixels 612. In another example, the frequency response shape function 616 may cause the frequency domain frequency response shaping engine 606 to apply a quantize operation followed by a dequantize operation using a quantizing factor determined for each individual frequency of the frequency domain representation of the input pixels 612.

The reverse transform engine 608 may be configured to receive a reverse transform 618 to convert the frequency domain representation of the input pixels 612 to the pixel space. For example, the reverse transform engine 608 may be configured to perform the reverse transform 618 on an output of the frequency domain frequency response shaping engine 606 to generate the output pixels 620 or a pixel domain representation of out of the frequency domain frequency response shaping engine 606. The output pixels 620 may be stored in the linear pixel output buffer 610 to allow a remote component (e.g., a video encoder or other circuit/module) to access the output pixels 620 for transmission or further processing.

Figure 7:
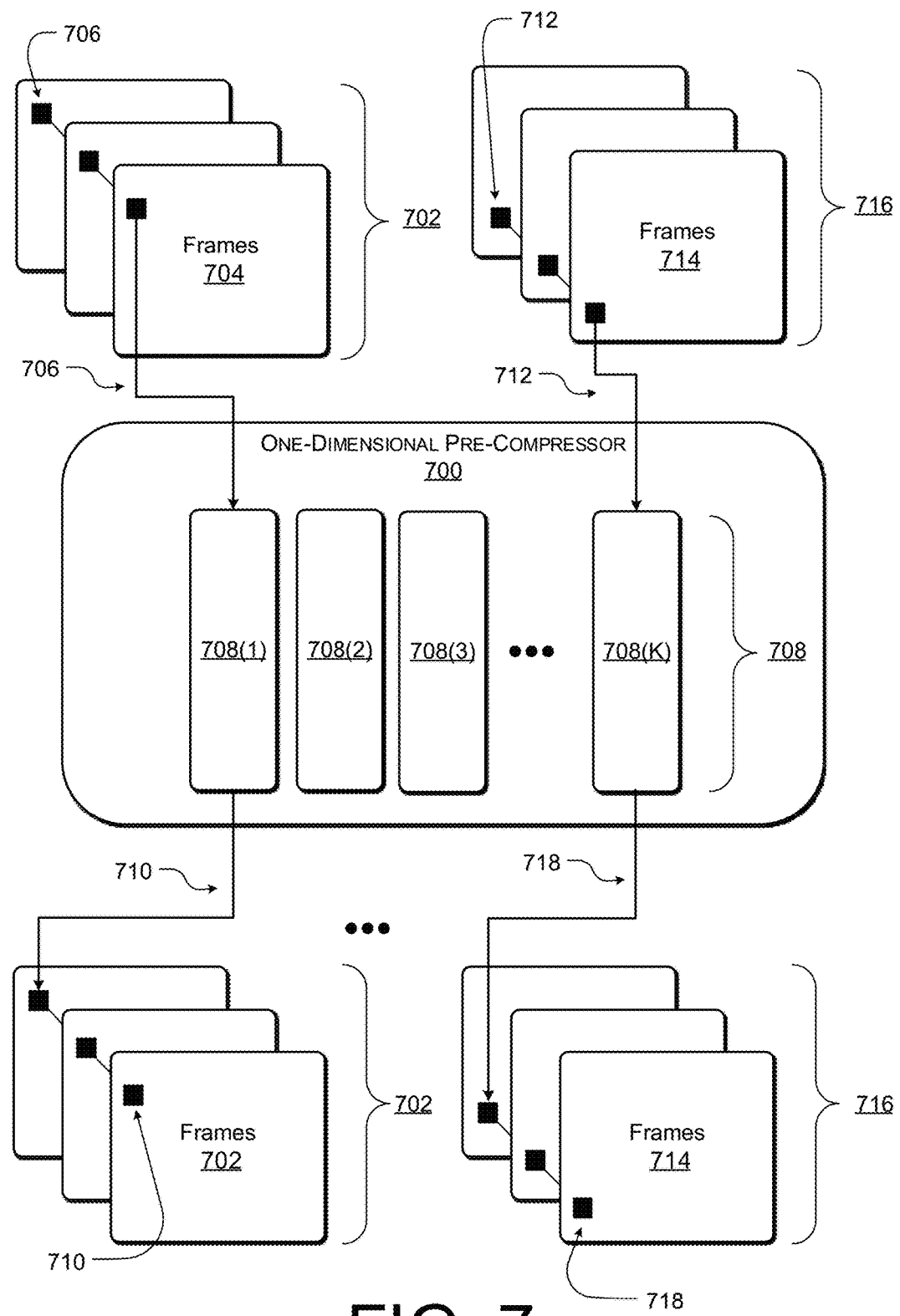
FIG. 7 illustrates an example of a one-dimensional processor for pre-compressing a video sequence according to some implementations.

FIG. 7 illustrates an example of a one-dimensional pre-compressor 700 for pre-compressing a video sequence according to some implementations. For example, a buffer, such as the linear input buffer 602 of FIG. 6 above, may store a video sequence 702 including a plurality of individual frames 704 to be pre-compressed. As discussed above, the one-dimensional pre-compressor 700 may be configured to process a series of adjacent pixels from within the frames 704 of the video sequence 702. In the illustrated example a temporal line of pixels is being processed as a unit. Thus, in the current example, one pixel from a fixed location or coordinate within each of the frames 704 may be selected to form the set of pixels 706.

The set of pixels 706 may then be accessed or received by one of a plurality of one-dimensional transform processors 708. In the illustrated example, each of the one-dimensional transform processors 708 may include a one-dimensional transform engine (such as forward transform engine 604), a one-dimensional frequency domain frequency response shaping engine (such as the frequency domain frequency response shaping engine 606), and a one-dimensional inverse transform engine (such as the inverse transform engine 608). In the illustrated example, the set of pixels 706 may be pre-compressed by the one-dimensional transform processors 708(1) to generate a set of output pixels 710 representative of the same visual content as the set of pixels 706 in the video sequence 702 but in a manner that when compressed by a video encoder results in an improved rate of compression.

Additionally, as illustrated in the current example, the one-dimensional processor 700 may include a plurality of one-dimensional transform processors 708(1)-(K). Thus, each of the one-dimensional transform processors 708(1)-(K) may process a set of pixels, such as set of pixels 706, in parallel. In the illustrated example, the one-dimensional transform processors 708(K) is configured to receive a set of pixels 712 of a second set of frames 714 of a second video sequence 716 (such as additional frames of the same video as the video sequence 702 or another video altogether). The one-dimensional transform processors 708(1)-(K) may pre-compress the set of pixels 712 into a set of pre-compressed output pixels 718 that may result in an improved rate of compression over the set of pixels 712 when compressed by a video encoder.

While the current example illustrates, one-dimensional transform processors 708(1) and 708(K) processing sets of pixels 706 and 712 from different video sequences 702 and 716 and different frames 704 and 714, in some instances, each of the one-dimensional transform processors 708(1)-(K) may process sets of pixels from the same video sequence and/or the same frames in parallel to improve the overall throughput of the one-dimensional pre-compressor 700.

Figure 8:
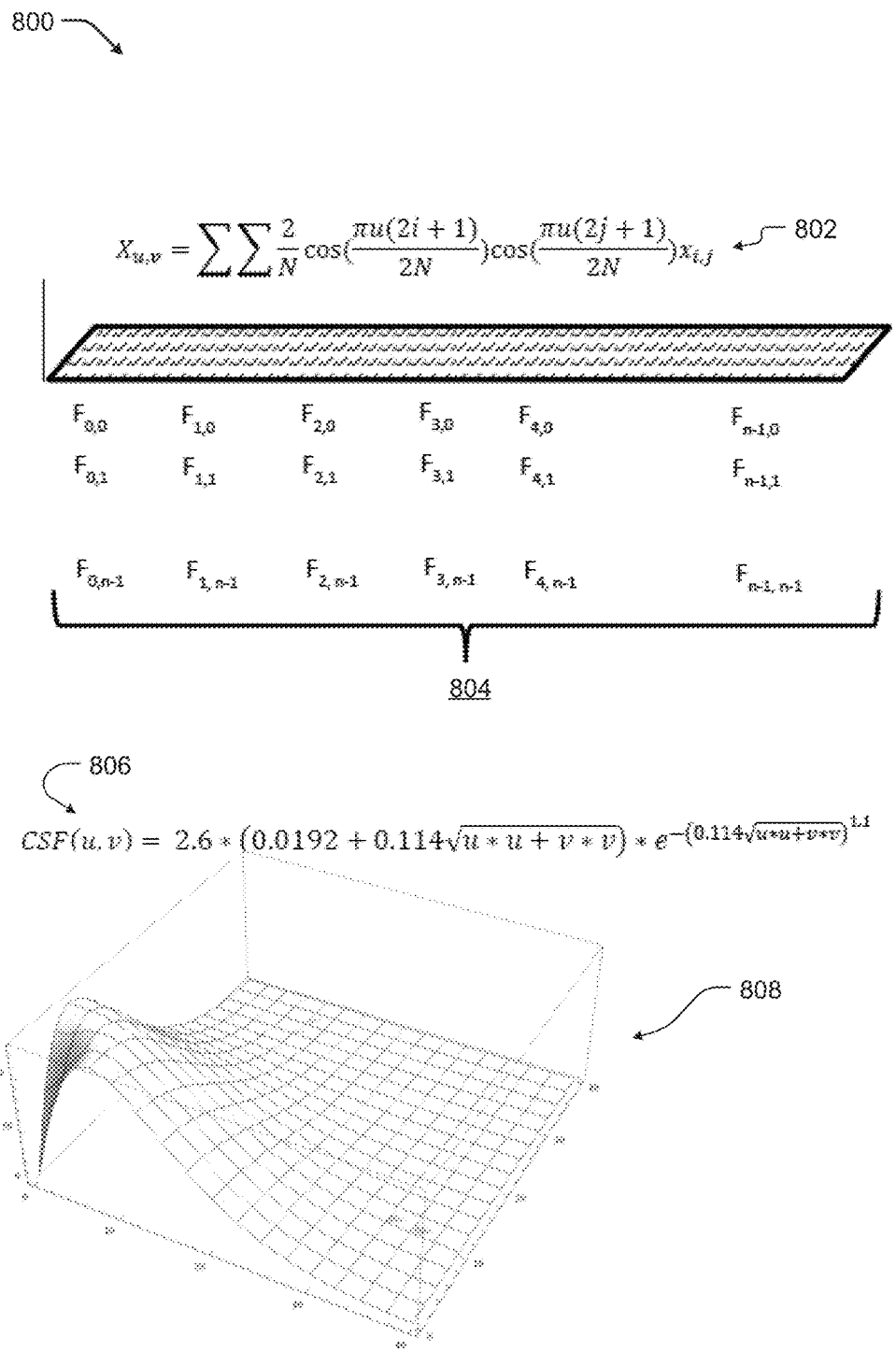
FIG. 8 illustrates an example graphical representation of multiplicative constants in a two-dimensional transform domain associated with a two-dimensional description of human visibility as a function of frequency according to some implementations.

FIG. 8 illustrates an example graphical representation of multiplicative constants 800 in a two-dimensional transform domain associated with a two-dimensional description of human visibility as a function of frequency according to some implementations. In the current example, a dimensional pre-compressor may assign multiplicative constants 800 to each individual frequency amplitude of a normalized two-dimensional human visual system transfer function.

For example, a reversible two-dimensional linear discrete transform 802 may be selected to map a two-dimensional set of discrete frequencies 804. The discrete frequencies 804 may be mapped using either an evenly-spaced or an unevenly spaced function in either of the two-dimensions. A normalized human visual system transfer function 806 may be defined in the two-dimensional frequency space such that substantially perfect reproduction of visual data as detected by a human eye may be defined as unity:

$$CSF(u, v) = 2.6*(0.0192 + 0.114\sqrt{u*u + v*v})*e^{-(0.114\sqrt{u*u+v*v})^{1.1}},$$

Where u and v are each associated with a frequency of the visual stimulus in cycles per degree in either pixel or line direction and CSF(u,v) is defined as a relative sensitivity of the human eye to the joint frequency u and v.

As shown in the illustrated example, the normalized two-dimensional human visual system transfer function is non-linear with respect to pixel-direction frequencies (u) and line-direction frequencies (v). Thus, in some cases, the normalized two-dimensional human visual system transfer function 806 is sampled at each frequency of the two-dimensional set of discrete frequencies 804. For instance, the illustrated example depicts a graph 808 of the normalized two-dimensional human visual system transfer function. As shown, the normalized two-dimensional human visual system transfer function 808 illustrates a typical grid of frequencies at which sampling of the two-dimensional human visual system transfer function 806 takes place.

FIG. 9 illustrates an example representation of a two-dimensional description of human contrast sensitivity as a function of frequency according to some implementations. In the illustrated example, a two-dimensional system contrast sensitivity function 900 is defined in terms of viewing conditions. For example, the viewing conditions may include an expected average ambient luminance I 902, and additional variables u 904, temporal frequency, $X_0$ 906 (e.g., angle subtended by DCT block), and $X_{max}$ 908 (e.g., angle subtended by display surface).

Figure 10:
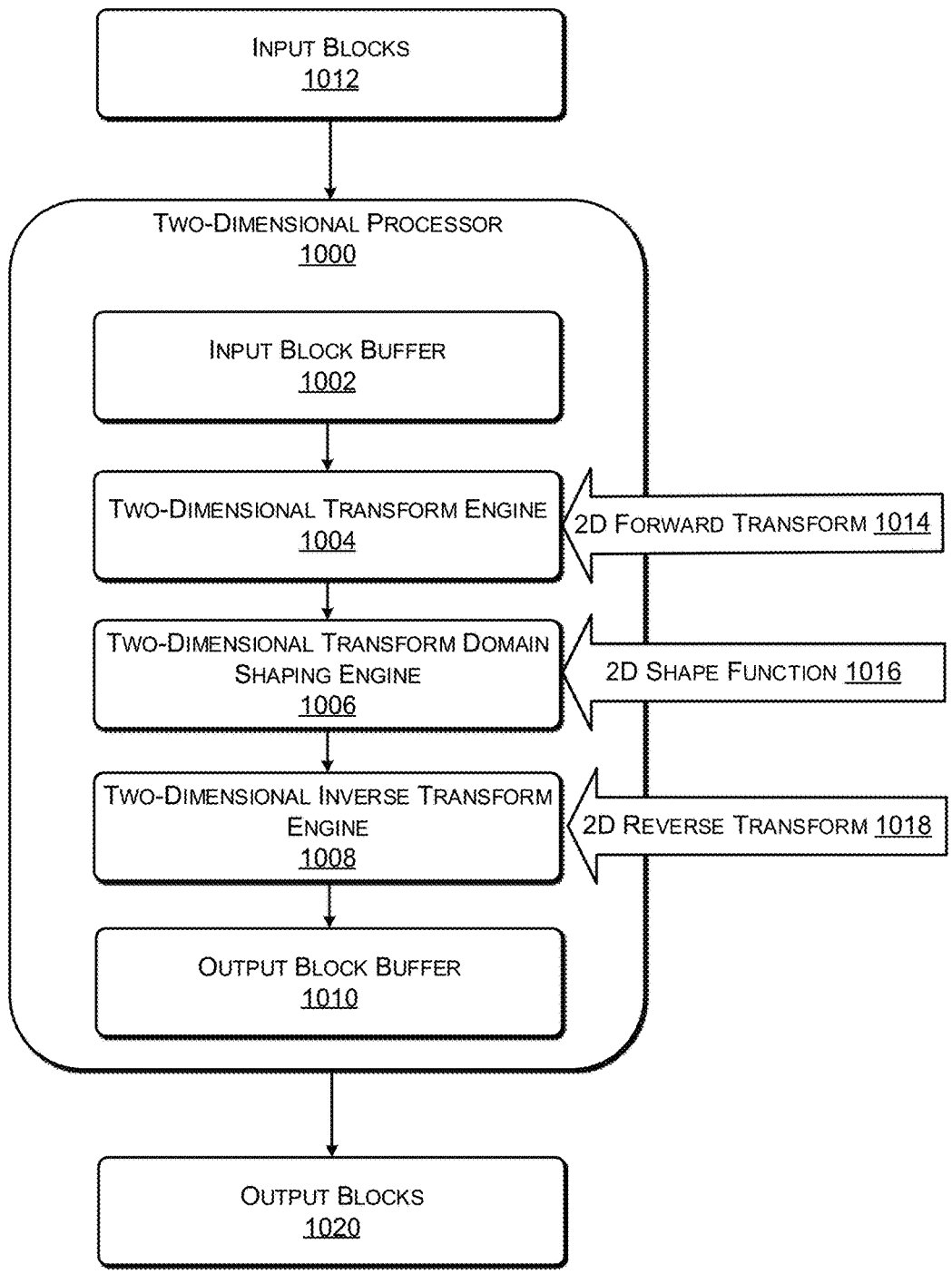
FIG. 10 illustrates an example a two-dimensional processor for pre-compressing a video sequence according to some implementations.

FIG. 10 illustrates an example a two-dimensional processor 1000 for pre-compressing a video sequence according to some implementations. The two-dimensional processor 1000 may include a frame sub-block input buffer 1002, a forward two-dimensional transform engine 1004, a two-dimensional frequency domain frequency response shaping engine 1006, a two-dimensional inverse transform engine 1008, and a frame sub-block output buffer 1010.

During operation, the two-dimensional processor 1000 receives input blocks 1012 and store the input blocks in the input block buffer 1002 prior to pre-compression. The input blocks 1012 may be associated with a block of pixels of a frame of a video sequence, a still image, or a photograph. Once the input blocks 1012 are buffered, the two-dimensional forward transform engine 1004 may receive a reversible two-dimensional linear forward transform 1014 selected as the transform for the pre-compression operations. In some cases, the reversible two-dimensional linear forward transform 1014 may be a stored internal transform that is fixed relative to the input blocks 1012, while in other cases, the reversible two-dimensional linear forward transform 1014 may be selected per buffering or per video sequence. For instance, the reversible two-dimensional forward transform 1014 may be an evenly-spaced transform (e.g., the Discrete Cosine Transform or the Karhunen-Loeve Transform), or an unevenly-spaced transform (e.g., a wavelet transform).

In some examples, the two-dimensional forward transform engine 1004 may be configured to perform the reversible two-dimensional linear forward transform 1014 on the input blocks 1012 stored in the frame sub-block input buffer 1002. The operation of the two-dimensional reversible two-dimensional linear forward transform 1014 on the input blocks 1012 generates a frequency domain representation of the input blocks 1012 store in the input buffer 1002.

The two-dimensional frequency domain frequency response shaping engine 1006 receives the frequency domain representation of the input blocks 1012. For example, the two-dimensional frequency domain frequency response shaping engine 1006 may be configured to apply a two-dimensional frequency response shape function 1016 to the two-dimensional frequency domain representation of the input blocks 1012 while stored in the input buffer 1002. The two-dimensional frequency response shape function 1016 may cause the two-dimensional frequency domain frequency response shaping engine 1006 to apply a multiplicative constant to individual frequency amplitudes of the two-dimensional frequency domain representation of the input blocks 1012. In another example, the two-dimensional frequency response shape function 1016 may cause the two-dimensional frequency domain frequency response shaping engine 1006 to apply a quantize operation followed by a dequantize operation using a quantizing factor determined for each individual frequency of the frequency domain representation of the input blocks 1012.

The two-dimensional reverse transform engine 1008 may be configured to receive a two-dimensional reverse transform 1018 to convert the two-dimensional frequency domain representation of the input blocks 1012 to the pixel space. For example, the two-dimensional reverse transform engine 1008 may be configured to perform the two-dimensional reverse transform 1018 on an output of the two-dimensional frequency domain frequency response shaping engine 1006 to generate output blocks 1020 or a pixel domain representation of out of the two-dimensional frequency domain frequency response shaping engine 1006. The output blocks 1020 may be stored in the output buffer 1010 to allow a remote component (e.g., a video encoder or other circuit/module) to access the output blocks 1020 for transmission or further processing.

Figure 11:
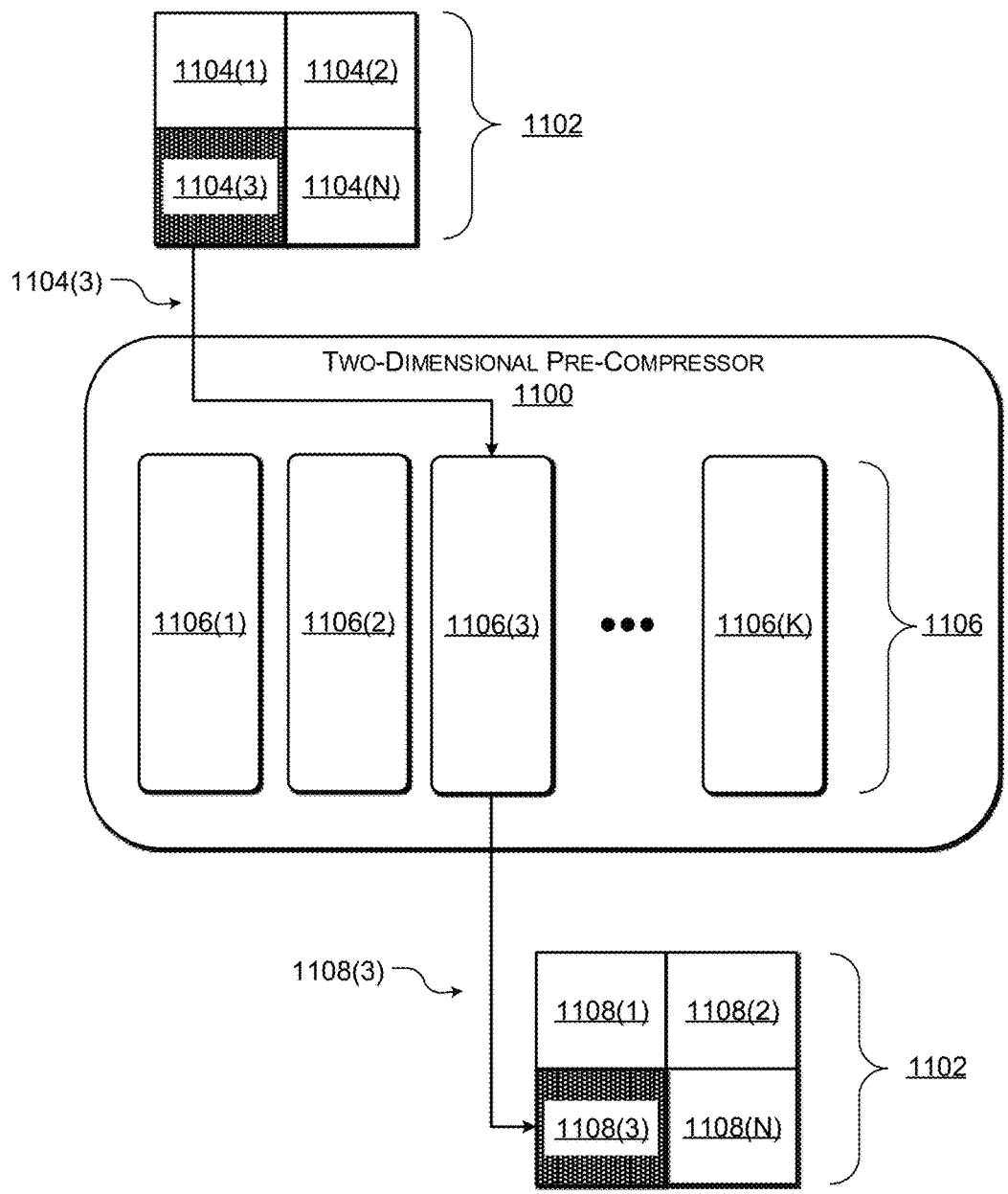
FIG. 11 illustrates an example of a two-dimensional pre-compressor for pre-compressing a video sequence according to some implementations.

FIG. 11 illustrates an example of a two-dimensional pre-compressor 1100 for pre-compressing a video sequence according to some implementations. For example, a buffer, such as the input block buffer 1002 of FIG. 10 above, may store a video sequence including a plurality of individual frames 1102 to be pre-compressed. As discussed above, the two-dimensional pre-compressor 1100 may be configured to process blocks of image data or sub-blocks of a frame 1104. In the illustrated example, the two-dimensional pre-compressor 1100 may be pre-compressing the sub-block 1104(3).

The sub-blocks 1104(3) may be accessed or received by one of a plurality of two-dimensional transform processors 1106. Each of the two-dimensional transform processors 1106 may include a two-dimensional transform engine (such as two-dimensional forward transform engine 1004), a two-dimensional frequency domain frequency response shaping engine (such as the two-dimensional frequency domain frequency response shaping engine 1006), and a two-dimensional inverse transform engine (such as the two-dimensional inverse transform engine 1008). In the illustrated example, the sub-block 1104(3) is being processed by the two-dimensional transform processors 1106(3). Thus, in one specific example, the other two-dimensional transform processors 1106(1) and 1106(2)-1106(K) may pre-compress the corresponding sub-blocks 1104(1) and 1104(2)-1104(K).

In one example, the two-dimensional transform processors 1106(3) may convert pixels of the sub-block 1104(3) into the frequency domain, quantize a frequency domain representation of the pixels of the sub-block 1104(3), and convert frequency domain representation of the pixels of the sub-block 1104(3) back into the pixel domain following quantization. Thus, the two-dimensional transform processors 1106(3) may generate pre-compress sub-block 1108(3) that may be a substantially visibly equivalent representation of the sub-block 1104(3) when viewed by a human. The pre-compress sub-block 1108(3) may result in an improved rate of compression over the sub-block 1104(3) when compressed by a video encoder.

In the illustrated example, it should be understood that the size of a frame sub-block 1108 is taken as the size of a block in the two-dimensional transform. In some cases, the size of the sub-blocks processed using two-dimensional transform may be equal to a size of a frame of the video sequence 1102.

Figure 12:
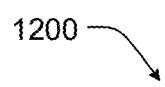
FIG. 12 illustrates an example representation a three-dimensional description of human visibility as a function of frequency according to some implementations.

FIG. 12 illustrates an example representation a three-dimensional description of human visibility as a function of frequency according to some implementations. For example, FIG. 12 shows a formulation of a three-dimensional human vision system transfer function 1202 which may be used to generate or assign multiplicative constants to individual frequency amplitudes in three-dimensions. In general, the normalized three-dimensional human visual system transfer function is not separable by pixel frequency u, line frequency v, or frame rate w and, thus, requires pre-compressing using a three-dimensional pre-compressor or using a three-dimensional domain transform.

FIG. 13 illustrates another example representation a three-dimensional description of human visibility as a function of frequency according to some implementations. For instance, the illustrated example shows a formulation of a three-dimensional system contrast sensitivity function 1300. The three-dimensional system contrast sensitivity function 1300 may be defined in terms of viewing conditions. In some cases, the viewing conditions may include configuration item expected average ambient luminance I 1302, additional variables s 1304, spatial frequency, w 1306 temporal frequency, $X_0$ 1308 (e.g., angle subtended by DCT block), and $X_{max}$ 1310 (e.g., angle subtended by display surface).

Figure 14:
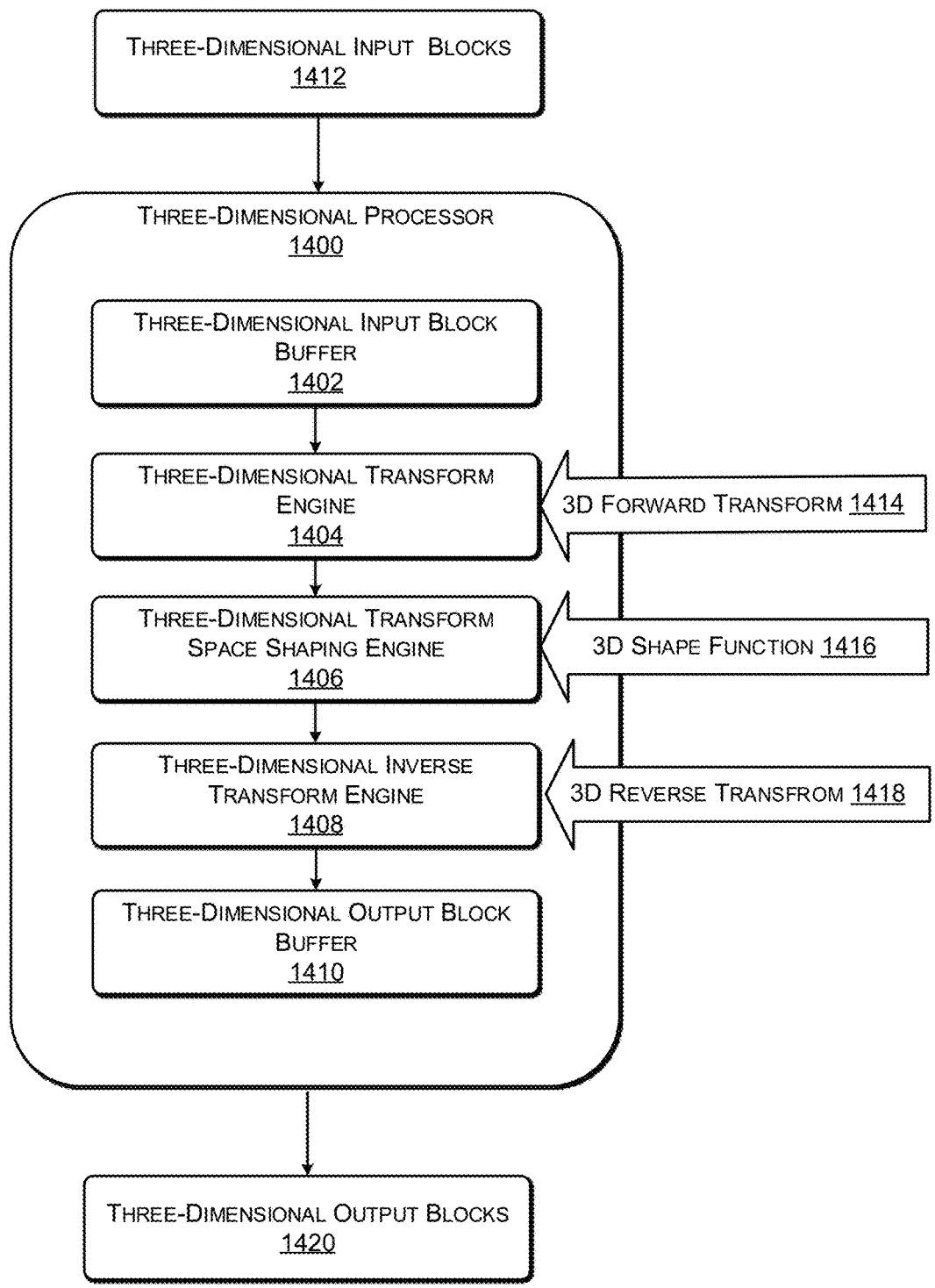
FIG. 14 illustrates an example a three-dimensional processor for pre-compressing a video sequence according to some implementations.

FIG. 14 illustrates an example a three-dimensional processor for pre-compressing 1400 a video sequence according to some implementations. The three-dimensional processor 1400 may include a frame sub-block input buffer 1402, a forward three-dimensional transform engine 1404, a three-dimensional frequency domain frequency response shaping engine 1406, a three-dimensional inverse transform engine 1408, and a frame sub-block output buffer 1410.

During operation, the three-dimensional processor 1400 receives three-dimensional input blocks 1412 and store the input blocks in the input block buffer 1402 prior to pre-compression. The input blocks 1412 may be associated with a block of pixels of a plurality of frames of a video sequence. Once the input blocks 1412 are buffered, the three-dimensional forward transform engine 1404 may receive a reversible three-dimensional linear forward transform 1414 selected as the transform for the pre-compression operations. In some cases, the reversible three-dimensional linear forward transform 1414 may be a stored internal transform that is fixed relative to the input blocks 1412, while in other cases, the reversible three-dimensional linear forward transform 1414 may be selected per buffering or per video sequence. For instance, the three-dimensional forward transform 1414 may be an evenly-spaced transform (e.g., the Discrete Cosine Transform or the Karhunen-Loeve Transform), or an unevenly-spaced transform (e.g., a wavelet transform).

In some examples, the three-dimensional forward transform engine 1404 may be configured to perform the reversible three-dimensional linear forward transform 1414 on the input blocks 1412 stored in the input buffer 1402. The operation of the reversible three-dimensional linear forward transform 1414 on the input blocks 1412 generates a frequency domain representation of the input blocks 1412 store in the input buffer 1402.

The three-dimensional frequency domain frequency response shaping engine 1406 receives the frequency domain representation of the input blocks 1412. For example, the three-dimensional frequency domain frequency response shaping engine 1406 may be configured to apply a three-dimensional frequency response shape function 1416 to the three-dimensional frequency domain representation of the input blocks 1412 while stored in the input buffer 1402. The three-dimensional frequency response shape function 1416 may cause the three-dimensional frequency domain frequency response shaping engine 1406 to apply a multiplicative constant to individual frequency amplitudes of the three-dimensional frequency domain representation of the input blocks 1412. In another example, the three-dimensional frequency response shape function 1416 may cause the three-dimensional frequency domain frequency response shaping engine 1406 to apply a quantize operation followed by a dequantize operation using a quantizing factor determined for each individual frequency of the frequency domain representation of the input blocks 1412.

The three-dimensional reverse transform engine 1408 may be configured to receive a three-dimensional reverse transform 1418 to convert the three-dimensional frequency domain representation of the input blocks 1412 to the pixel space. For example, the three-dimensional reverse transform engine 1408 may be configured to perform the three-dimensional reverse transform 1418 on an output of the three-dimensional frequency domain frequency response shaping engine 1406 to generate output blocks 1420 or a pixel domain representation of out of the three-dimensional frequency domain frequency response shaping engine 1406. The output blocks 1420 may be stored in the output buffer 1410 to allow a remote component (e.g., a video encoder or other circuit/module) to access the output blocks 1420 for transmission or further processing.

Figure 15:
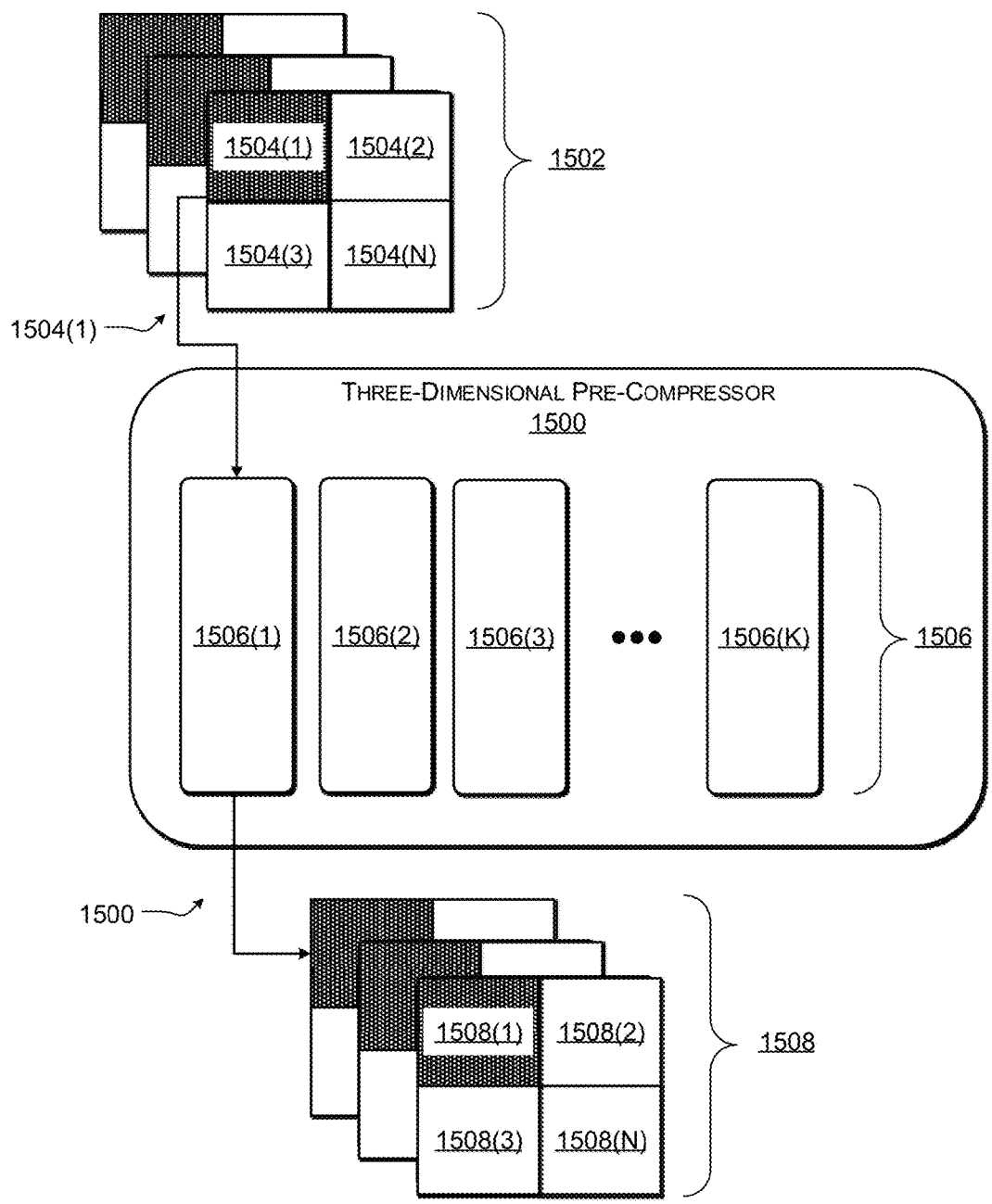
FIG. 15 illustrates an example of a three-dimensional pre-compressor for pre-compressing a video sequence according to some implementations.

FIG. 15 illustrates an example of a three-dimensional pre-compressor 1500 for pre-compressing a video sequence according to some implementations. For example, a buffer, such as the input block buffer 1402 of FIG. 14 above, may store a multiple sub-blocks over a plurality of individual frames 1502 to be pre-compressed as a unit. For example, the sub-blocks 1504(1) may be stored in the input block buffer 1402 to process as a unit or block of image data. As discussed above, the three-dimensional pre-compressor 1500 may be configured to process three-dimensional blocks of image data or sub-blocks of multiple frames 1504. In the illustrated example, the three-dimensional pre-compressor 1500 may be pre-compressing the sub-block 1504(3) over multiple frames.

The sub-blocks 1504(1) may be accessed or received by one of a plurality of three-dimensional transform processors 1506. Each of the three-dimensional transform processors 1506(1)-(K) may include a three-dimensional transform engine (such as three-dimensional forward transform engine 1404), a three-dimensional frequency domain frequency response shaping engine (such as the three-dimensional frequency domain frequency response shaping engine 1406), and a three-dimensional inverse transform engine (such as the three-dimensional inverse transform engine 1408). In the illustrated example, the sub-block 1504(1) is being processed by the three-dimensional transform processors 1506(1). Thus, in one specific example, the other three-dimensional transform processors 1506(2)-1106(K) may pre-compress the corresponding sub-blocks 1504(2)-1504(K).

In one example, the three-dimensional transform processors 1506(1) may convert pixels of the sub-blocks 1504(1) into the frequency domain, quantize a frequency domain representation of the pixels of the sub-block 1504(1), and convert frequency domain representation of the pixels of the sub-block 1504(1) into the pixel domain following quantization. Thus, the three-dimensional transform processors 1506(1) may generate pre-compress sub-block 1508(1) that may be a substantially visibly equivalent representation of the sub-block 1504(1) when viewed by a human. The pre-compress sub-block 1508(1) may result in an improved rate of compression over the sub-block 1504(1) when compressed by a video encoder.

In the illustrated example, it should be understood that the size of a frame sub-block 1504 is taken as the size of a block in the three-dimensional transform. In some cases, the size of the sub-blocks processed using three-dimensional transform may be equal to a size of a frame 1502. It should also be understood, that the multiple frames 1502 may include more than four sub-blocks.

Figure 16:
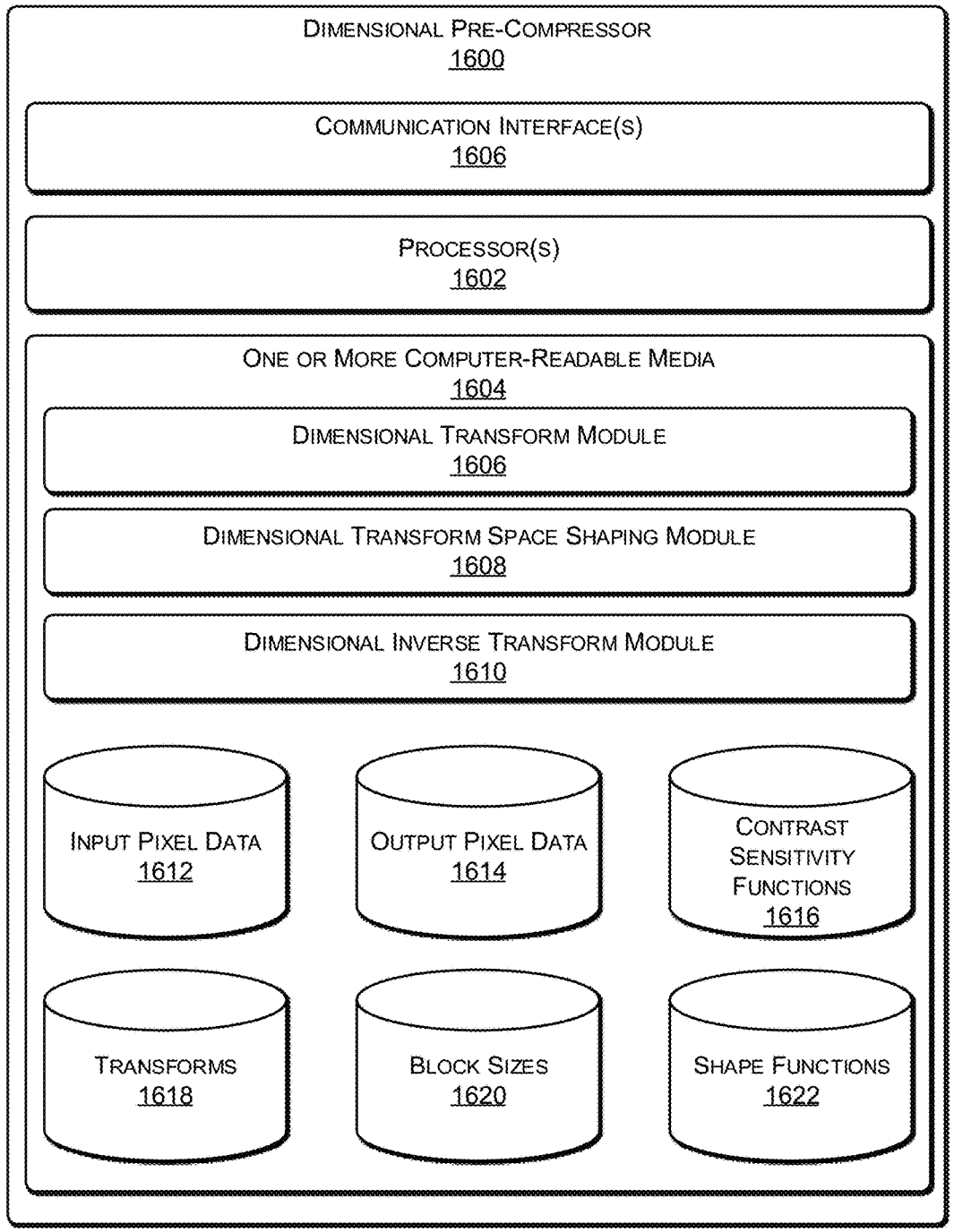
FIG. 16 illustrates example components an electronic device that may be configured to perform pre-compression according to some implementations.

FIG. 16 illustrates example components of an electronic device that may be configured to perform pre-compression according to some implementations. For example, in some cases, a dimensional pre-compressor 1600 may be formed in software. Thus, in some cases, the dimensional pre-compressor 1600 may include processing resources, as represented by processors 1602, and computer-readable storage media 1604. The computer-readable storage media 1604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The dimensional pre-compressor 1600 may also include one or more communication interfaces 1606, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 1606 may allow the dimensional pre-compressor 1600 to receive image data, such as video sequences, frames, or still images. The communication interfaces 1606 may also allow the position recognizing system 1300 to send the output data (e.g., the pre-compressed frames) to a video encoder or remote receiver device.

Several modules, sets of instructions, data stores, and so forth may be stored within the computer-readable media 1604 and configured to execute on the processors 1602. For example, a dimensional forward transform module 1608, a dimensional transform space shaping module 1610, and a dimensional reverse transform module 1612, as well as other modules. In some implementations, the computer-readable media 1604 may store data, such as store input pixel or block data 1612 (e.g., the original video sequences or images), output pixel or block data 1614 (e.g., the pre-compressed video sequences or images), one or more contrast sensitivity functions (e.g., the contrast sensitivity of the human eye), one or more transforms 1618 (e.g., one, two, or three dimensional transforms in the forward or reverse direction including wavelet transforms, the Discrete Cosine Transform, the Karhunen-Loeve transform, or other linear transforms), various block sizes associated with the one or more transforms 1618, and one or more shaping functions.

In some examples, the dimensional forward transform module 1608 may apply a forward transform to generate a frequency domain reparation of an input image or video sequence. The dimensional transform space shaping module 1610 may quantize and/or dequantize the frequency domain reparation of an input image to remove information from the input image or video sequence that is substantially imperceptible to the human eye using a function representative of contrast sensitivity of the human eye. The dimensional reverse transform module 1612 apply a reverse transform to generate a pixel domain representation of the output of the dimensional transform space shaping module 1610.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method for pre-compressing image data comprising:
  receiving an original video sequence, the original video sequence including a set of frames, individual frames having a set of lines, individual lines having a set of pixels;
  transforming the original video sequence into a linearly equivalent transform representation of the original video sequence in a linearly equivalent transform space;
  pre-compressing the linearly equivalent transform representation of the original video sequence to generate a pre-compressed representation of the original video sequence in the linearly equivalent transform space, the pre-compressing including quantization of the original video sequence by visually optimal quantizers for visual data of specified angular size and resolution, the specified angular size and resolution determined by an application of a spatial contrast sensitivity function to frequencies of the transform components associated with a two-dimensional transform, transform components resulting from an application of the two-dimensional transform to blocks of the visual data, each of the blocks having a specified transformation block size; and
  performing an inverse transform operation on the pre-compressed representation of the original video sequence in the linearly equivalent transform space to construct a pre-compressed video sequence substantially visibly equivalent to the original video sequence, the pre-compressed video sequence compressible, by a video encoder, to a smaller size than the original video sequence.

2. The method as recited in claim 1, wherein the linearly equivalent transform is at least one of:
  a partially-decorrelating transform;
  a Karhunen-Loeve Transform;
  a Discrete Cosine Transform; or
  a Wavelet Transform.

3. The method as recited in claim 1, wherein the pre-compression of the linearly equivalent transform representation of the original video sequence includes quantization of the linearly equivalent transform representation of the original video sequence by a quantizer in a plurality of dimensions.

4. The method as recited in claim 1, further comprising:
  compressing the pre-compressed video sequences to produce a compressed representation of the pre-compressed video sequences; and
  sending the compressed representation of the pre-compressed video sequence to remote video decoder.

5. One or more non-transitory computer-readable media having computer-executable instructions which, when executed by one or more processors, cause the one or more processors to perform operations comprising:
  transforming original image data into a linearly equivalent transform representation of the original image data in a linearly equivalent transform space;
  pre-compressing the linearly equivalent transform representation of the original image data to generate a pre-compressed representation of the original image data in the linearly equivalent transform space, the pre-compressing inducing quantization by visually optimal quantizers for time-varying image data having specified frame rate, angular size and resolution, the specified frame rate, angular size and resolution determined by an application of a spatiotemporal contrast sensitivity function to frequencies of transform components associated with a three-dimensional transform, transform components resulting from an application of the three-dimensional transform to blocks of the time-varying image data, each of the blocks having a specified transformation block size; and
  performing an inverse transform operation on the pre-compressed representation of the original image data in the linearly equivalent transform space to construct pre-compressed image data, the pre-compressed image data being substantially equivalent to the original image data when viewed by a person, the pre-compressed image data compressible to a smaller size than the original image data.

6. The one or more non-transitory computer-readable media as recited in claim 5, wherein the linearly equivalent transform is at least one of:

a partially-decorrelating transform;
a Karhunen-Loeve Transform;
a Discrete Cosine Transform; or
a Wavelet Transform.

7. The one or more non-transitory computer-readable media as recited in claim 5, wherein the pre-compressing the linearly equivalent transform representation of the original image data includes quantization of the linearly equivalent transform representation of the original image data by a band-pass function quantizer in a plurality of dimensions.

8. The one or more non-transitory computer-readable media as recited in claim 5, further comprising:
   compressing the pre-compressed image data to produce a compressed representation of the pre-compressed image data; and
   sending the compressed representation of the pre-compressed image data to remote video decoder.

9. A dimensional processor comprising:
   a dimension transform engine to apply a reversible linear forward transform to image data in the pixel domain to generate a linearly equivalent transform representation of the image data;
   a dimensional transform domain shape engine to pre-compress the linearly equivalent transform representation of the image data to generate a pre-compressed representation of the image data, the pre-compressing including:
      determining transform components from an application of the two-dimensional transform to blocks of the image data, each of the blocks having a specified transformation block size;
      determining a specified angular size and resolution by an application of a spatial contrast sensitivity function to frequencies of the transform components;
      quantization of the image data by visually optimal quantizers for visual data of the specified angular size and resolution; and
   an inverse transform engine to apply a reverse transform to the pre-compressed representation of the image data to generate a pre-compressed image data.

10. The dimensional processor as recited in claim 9, further comprising:
    a video encoder to compress the pre-compressed image data to produce a compressed representation of the pre-compressed image data in the pixel domain; and
    a communication interface for sending the compressed representation of the pre-compressed image data to remote video decoder.

11. The dimensional processor as recited in claim 9, further comprising an input buffer to store the image data.

12. The dimensional processor as recited in claim 9, wherein:
    the dimensional processor is a two-dimensional processor; and
    the images data includes a block of pixels from a frame of the plurality of frames of the image data.

13. The dimensional processor as recited in claim 9, wherein:
    the images data includes a series of adjacent blocks of pixels, each of the blocks of pixels associated with one of the plurality of frames of the image data.

14. The method as recited in claim 1, further comprising sending the pre-com pressed representation of the original video sequence to remote video decoder.

15. The one or more non-transitory computer-readable media as recited in claim 5, wherein the one or more non-transitory computer-readable media stores additional computer-executable instructions which, when executed by the one or more processors, causes the one or more processors to perform operations comprising sending the pre-compressed representation of the original video sequence to remote video decoder.

16. The dimensional processor as recited in claim 9, further comprising an output buffer to allow a remote component to access the pre-compressed representation of the original video sequence by storing the pre-compressed representation of the original video sequence.

17. The dimensional processor as recited in claim 9, further comprising a communication interface to send the pre-compressed representation of the original video sequence to remote video decoder.

18. The dimensional processor as recited in claim 9, wherein the linearly equivalent transform is at least one of:
    a partially-decorrelating transform;
    a Karhunen-Loeve Transform;
    a Discrete Cosine Transform; or
    a Wavelet Transform.

19. The dimensional processor as recited in claim 9, wherein the transform components associated the two-dimensional transform.

20. The dimensional processor as recited in claim 9, wherein the contrast sensitivity function is a spatiotemporal contrast sensitivity function.

* * * * *